United States Patent
Kessen et al.

[11] Patent Number: 6,036,370
[45] Date of Patent: Mar. 14, 2000

[54] WHEEL BEARING WITH SELF-ALIGNING WHEEL SPEED SENSOR RING

[75] Inventors: Jeffrey Steven Kessen, Farmington Hills, Mich.; David Hippolyte Payen, Erquinghem-Lys, France

[73] Assignee: General Motors Corporation, Detroit, Mich.

[21] Appl. No.: 09/143,812

[22] Filed: Aug. 31, 1998

[51] Int. Cl.[7] .................................................. F16C 19/08
[52] U.S. Cl. ............................................................ 384/448
[58] Field of Search .................................. 384/448, 446, 384/544, 589, 512

[56] References Cited

U.S. PATENT DOCUMENTS

| | | |
|---|---|---|
| 3,589,747 | 6/1971 | Asberg .................................. 280/96.1 |
| 4,179,167 | 12/1979 | Lura et al. . |
| 5,606,254 | 2/1997 | Xie et al. ................................ 324/174 |
| 5,723,977 | 3/1998 | Moretti .................................. 384/448 |
| 5,821,422 | 10/1998 | Ouchi ..................................... 384/448 |

*Primary Examiner*—Lenard A. Footland
*Attorney, Agent, or Firm*—Robert M. Sigler

[57] ABSTRACT

A wheel bearing includes a spindle having a center axis of rotation and an annular formed bead on an axial end of the spindle. The wheel bearing also includes a self-aligning sensor ring disposed concentric with the center axis of rotation of the spindle and positioned on the spindle and retained adjacent the bead on the spindle.

14 Claims, 4 Drawing Sheets

6,036,370

WHEEL BEARING WITH SELF-ALIGNING WHEEL SPEED SENSOR RING

TECHNICAL FILED

The present invention relates to wheel bearings for motor vehicles and, more particularly, to a wheel bearing with a self-aligning wheel speed sensor ring positioned on a spindle of the wheel bearing for a motor vehicle.

BACKGROUND OF THE INVENTION

In a motor vehicle, power from a power source such as an engine is transferred through a drivetrain to wheels to provide movement of the vehicle. The wheels are either of the driven or non-driven type and are operably connected to a steering system of the motor vehicle through a wheel bearing as is known in the art. Wheel bearings, of the type in which an inner race or spindle is supported within a surrounding outer race or hub by two axially spaced rows of rolling elements, such as bearing balls, are frequently utilized for motor vehicles.

An example of a wheel bearing is disclosed in commonly assigned U.S. Pat. No. 4,179,167 which issued Dec. 18, 1979. A separable race slides freely onto an outer surface of a spindle until it hits an outer ball row. As it makes contact with the outer ball row, its outer edge rests past an inner wall of a groove machined into the spindle. The separable race is forced and held against its ball row by an assembly apparatus to a desired preload, and then the axial spacing of its outer edge from an outer wall of the groove is accurately gauged. Next, a pair of selected thickness keeper rings, chosen from a pre-machined assortment, are tightly inserted between the outer edge of the separable race and a far wall of the groove. The keeper rings hold the proper race location and so maintain the preload or end play as desired. Finally, a sleeve shaped retaining ring must be swaged over the keeper rings to hold them radially down into the groove.

Another example of a wheel bearing is disclosed in U.S. Pat. No. 3,589,747 which issued Jun. 29, 1971. The wheel bearing includes a cylindrical body having an out-turned flange on one axial end and inner race ring bearing surfaces formed by grinding an exterior surface of a forward end of the body. The wheel bearing includes a one-piece common outer race ring overlying the inner race ring bearing surfaces and at least two rows of rolling elements. The outer race ring is held in position by cold-forming the body to form a locking flange for retaining the outer race ring in place.

While these wheel bearings have worked well over the years, several refinements have been made to the overall design. More recently, a method for retaining a separable bearing race to an inner bearing member was disclosed in a commonly assigned pending U.S. patent application Ser. No. 723,452, filed Oct. 7, 1996 entitled "Bearing With Integrally Retained Separable Race", the disclosure of which is hereby incorporated by reference. In this example, a deformable lip of the inner bearing member is rolled over into a race abutting bead which prevents movement of the inner bearing member.

Modern vehicle systems, such as anti-lock braking, navigational, traction control and tire pressure monitoring rely on wheel speed as an input. The incorporation of a rotational sensor in a vehicle wheel bearing is an indicator of wheel rotation from which wheel speed can be computed.

A commonly known sensing mechanism of wheel rotation is a variable reluctance sensor for sensing the rotational speed of a toothed target, also referred to as a sensor ring. Such a sensor is disclosed in commonly assigned U.S. Pat. No. 5,606,254 which issued Feb. 25, 1997. The sensor includes an elongated core interposed between two permanent magnets which generate additive magnetic flux passing longitudinally through the elongated core. The elongated core and permanent magnets are encircled by a multi-turn electrical coil, which is wound transversely about a longitudinal dimension. A portion of the elongated core and permanent magnets extends beyond the electrical coil and are positioned adjacent a periphery of the sensor ring and define an air gap between them. In this example, the sensor ring is mounted to the wheel bearing. In operation, as the sensor ring rotates, the air gap is varied which, in turn, varies the magnitude of the opposing longitudinal components of magnetic flux with respect to one another. The resulting output voltage generated in the electrical coil has an amplitude proportional to the rate of change of the net longitudinal flux magnitude and a frequency proportional to the rotational speed of the sensor ring.

In the past, the sensor ring was installed by first orienting it, and pressing it onto the inner ring portion of the wheel bearing. While this assembly method has proven to be solid and robust for many years, a less costly system in terms of parts, assembly steps or configuration is desired.

SUMMARY OF THE INVENTION

According to the present invention, a wheel bearing with a robust, economic and uncomplicated sensor ring and mounting is provided. An aspect of the invention encompasses providing a means of significantly improving the configuration of a sensor ring, thereby reducing the complexity of manufacturing the sensor ring and assembling the sensor ring onto a wheel bearing.

According to this aspect, a wheel bearing is provided that includes a spindle having a center axis of rotation and an annular formed bead on an axial end of the spindle. The wheel bearing also includes a self-aligning sensor ring disposed concentric with the center axis of rotation of the spindle and positioned on the spindle and retained adjacent the bead on the spindle.

Advantageously, the present invention is amenable to assembling a sensor ring onto a spindle without regard for the orientation of the sensor ring. For example, in the wheel bearing, a flat shape of the sensor ring allows either side of the sensor ring to abut an inner ring. The sensor ring is advantageously self-aligning. In deforming the end of the spindle, the flow of material will center the sensor ring with respect to the center axis of rotation of the wheel bearing. It has been found advantageous to the accuracy of the wheel speed sensor that the dimensional orientation between the sensor ring and the wheel speed sensor be maintained. For example, a larger air gap may lower the peak to peak amplitude of the output voltage signal. A factor which may influence the dimensional orientation is the precision in which the sensor ring is manufactured. Advantageously, the sensor ring is a simple design, including less mass, that is easier to manufacture. Another factor is variability in mounting the sensor ring to the wheel bearing. It has been found advantageous in the forming of the bead that the sensor ring positions itself concentric with the center axis of rotation of the spindle. These benefits are achieved in an uncomplicated manner and contribute to the self-aligning sensor ring.

Other features and advantages of the present invention will be readily appreciated as the same becomes better understood after reading the subsequent description when considered in connection with the accompanying drawings.

DETAILED DESCRIPTION OF THE PRESENTLY PREFERRED EMBODIMENT

Figure 1:
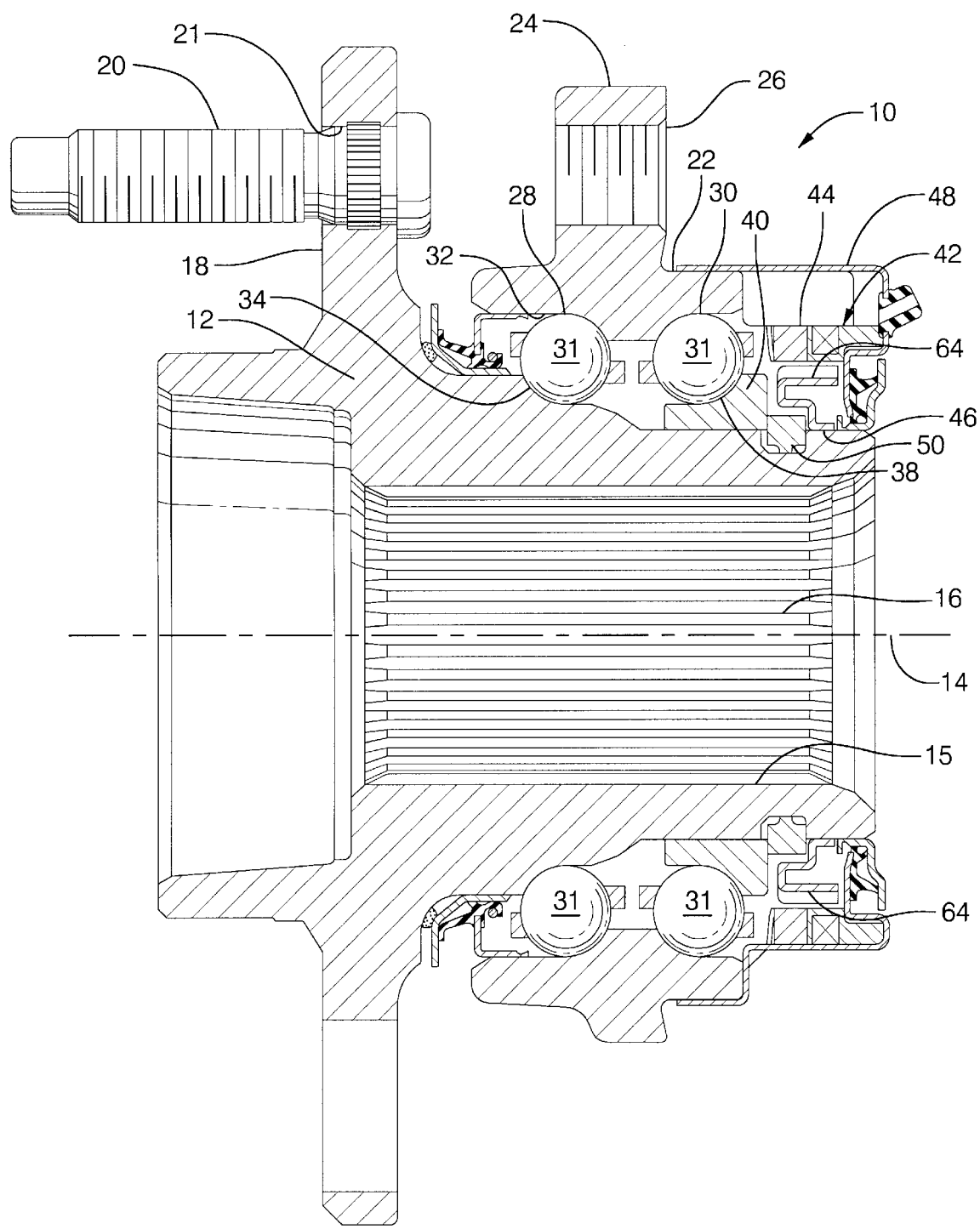
FIG. 1 is a fragmentary cross-sectional view of a prior art wheel bearing.

Referring to the drawings, illustrated in FIG. 1 is one embodiment of a wheel bearing 10 for a motor vehicle (not shown). In this example, the wheel bearing 10 is a keeper and groove retained wheel bearing, as is known in the art.

The wheel bearing 10 includes a cylindrical body, commonly referred to as a spindle 12. The spindle 12 is generally annular in cross-sectional shape and extends axially with a center axis of rotation 14 for the wheel bearing 10. The spindle 12 has an aperture 15 extending axially therethrough with splines 16 extending axially along an inner diameter of the aperture 15 to operably connect to a drive shaft (not shown) passing through the spindle 12. The splines 16 provide a splined fit between the drive shaft and the spindle 12. It should be appreciated that the spindle 12 could have a solid center, such as for a trailer bearing, for a wheel bearing 10 of the non-driven type.

The spindle 12 also includes an attachment flange 18 extending radially at an outboard end thereof for attaching a wheel and tire assembly (not shown) to the wheel bearing 10. The wheel and tire assembly is secured to the wheel bearing 10 by suitable means such as at least one wheel bolt or stud 20 pressed into an aperture 21 in the attachment flange 18 and a lug nut (not shown) threadably engaging the wheel bolt 20.

The wheel bearing 10 includes an outer race, also referred to as a hub 22, for operably connecting the wheel bearing 10 to a vehicle suspension system (not shown). The hub 22 is annular and tubular in shape and extends axially. The hub 22 includes a hub flange 24 extending radially for securing the hub 22 to the vehicle suspension system. The hub 22 is secured to the vehicle suspension system by suitable means such as a bolt (not shown) which passes through an aperture 26 in the hub flange 24. It should be appreciated that the hub 22 is stationary relative to the rotatable spindle 12.

In this example, the wheel bearing 10 includes an outboard rolling element row 28 and an inboard rolling element row 30, axially spaced apart, so as to provide a desired load support and axial stiffness. The outboard rolling element row 28 and inboard rolling element row 30 run on two pairs of convergent angular contact pathways. The outboard rolling element row 28 and inboard rolling element row 30 retain a full complement of rolling elements such as spherical balls 31. The outboard rolling element row 28 runs on an outboard outer pathway 32 and an outboard inner pathway 34 that are ground integrally into the hub 22 and spindle 12, respectively. The inboard rolling element row 30 runs on an inboard outer pathway 36 that is ground integrally into the hub 22 and an inboard inner pathway 38 that is ground into a separable generally ring shaped race, referred to as an inner ring 40. The inner ring 40 is annular and tubular in shape. The inner ring 40 is fittingly secured over the spindle 12.

The wheel bearing 10 also includes a sensor assembly 42 for determining wheel speed from wheel rotation. The sensor assembly 42 includes a wheel speed sensor 44 such as a variable reluctance sensor. The sensor assembly 42 also includes a sensor ring 46 mounted onto the wheel bearing 10. The wheel speed sensor 44 and sensor ring 46 are annular in shape.

The wheel speed sensor 44 is positioned in operational relationship with the sensor ring 46. The wheel speed sensor 44 is fixedly mounted to the wheel bearing 10. For example, the wheel speed sensor 44 may be secured to the hub 22 by an interference fit about the hub 22 by a housing portion 48 of the wheel speed sensor 44, as is known in the art. The sensor ring 46 may be oriented and retained on the wheel bearing 10 by pressing the sensor ring 46 onto the spindle 12. The concentricity of the sensor ring 46 with respect to the center axis of rotation 14 is necessary for the wheel speed sensor 44 to provide a robust output signal.

Figure 2:
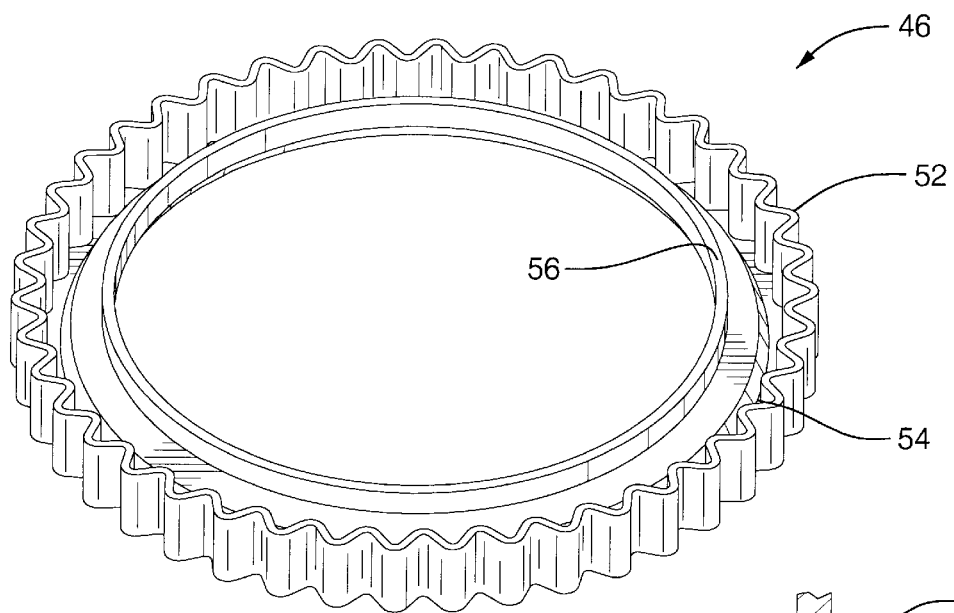
FIG. 2 is a perspective view of a prior art sensor ring of the wheel bearing of FIG. 1.

As illustrated in FIG. 2, the sensor ring 46 is a three-dimensional stamped annular ring having a row of evenly spaced teeth 52 axially extending from an outer diameter 54. The sensor ring 46 includes an inner diameter 56 having cylindrical shape to provide a press fit of the sensor ring 46 onto the spindle 12 of the wheel bearing 10. The cylindrical shape of the inner diameter 56 provides an annular press surface to ensure the concentricity of the sensor ring 46 with respect to the center axis of rotation 14 of the wheel bearing 10. The sensor ring 46 is manufactured within strict dimensional tolerances, including a "true" inner and outer diameter, and precise alignment of the teeth 52. The geometry of the teeth 52 requires that the teeth 52 be perpendicular to the center axis of rotation 14 of the wheel bearing 10. Also, a consistent distance between each individual tooth 52 assists in maintaining the necessary precision in the circumferential spacing of the teeth 52. Any dimensional variation in the manufacture or assembly of the sensor ring 46 may influence the output of the wheel speed sensor 44. For example, a larger air gap may lower the peak to peak amplitude of the output voltage signal of the wheel speed sensor 44.

A disadvantage in manufacturing the sensor ring 46 is that the dimensional tolerance of the inner diameter 56 needs to be strictly maintained to preserve the accuracy of the wheel speed sensor 44. A disadvantage in installing the sensor ring 46 is that it must be properly oriented onto the spindle 12 such that the teeth 52 are in proper axial relation to the wheel speed sensor 44.

Figure 3:
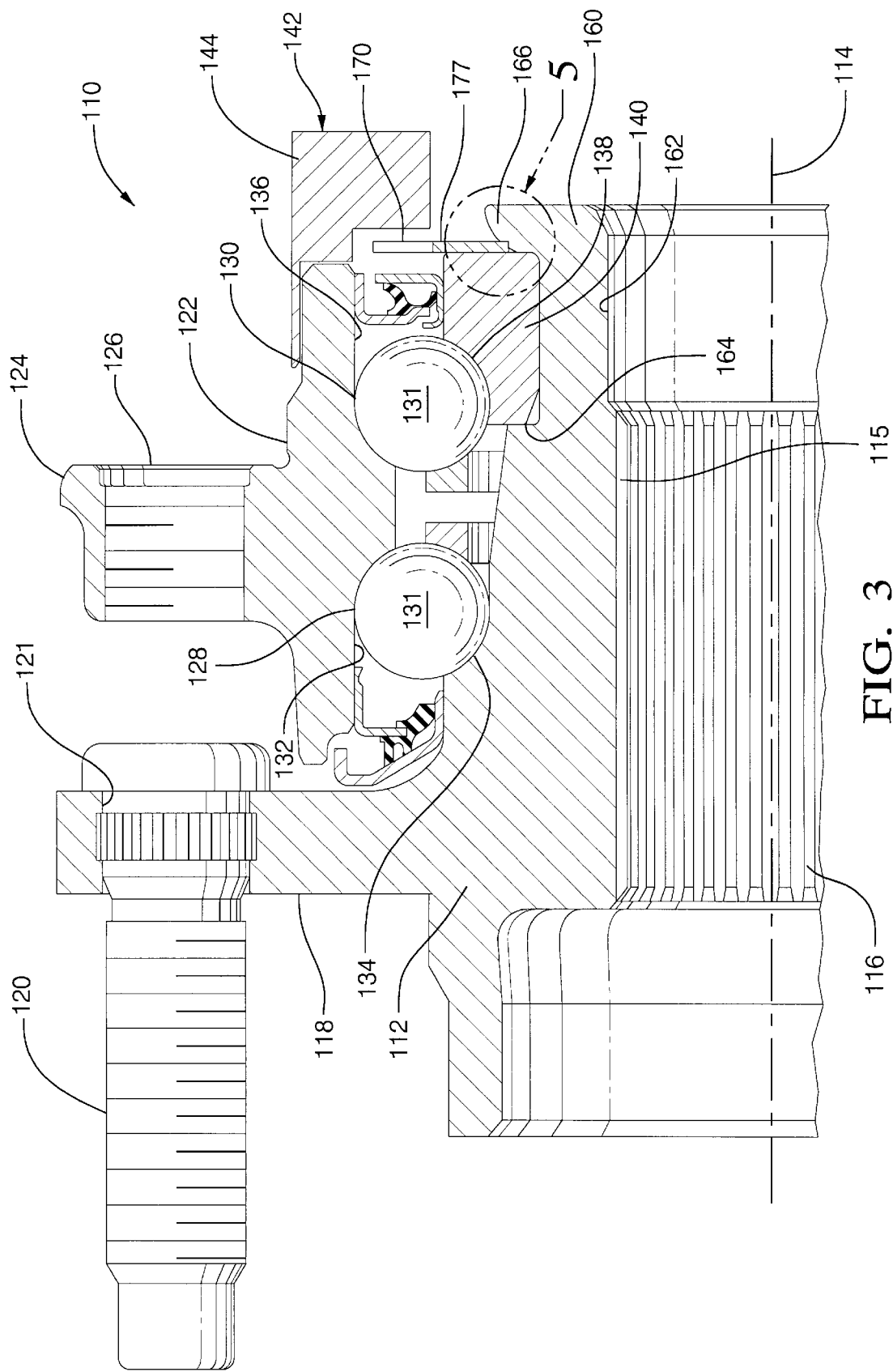
FIG. 3 is a fragmentary cross-sectional view of a wheel bearing according to the present invention.

Referring to FIG. 3, a wheel bearing 110, according to the present invention, is shown. Like parts of the wheel bearing 10 have like reference numerals increased by one hundred (100). At the outset, it will be apparent to one skilled in the art that the present invention, though disclosed as a sensor ring for a wheel bearing for a driven wheel, is not so limited in use and will lend itself to application in a non-driven wheel as well as other types of wheel bearings.

The wheel bearing 110 includes the spindle 112 having a center axis of rotation 114, an aperture 115 with splines 116, and an attachment flange 118 with an aperture 121 and wheel bolt 120. The wheel bearing 110 also includes an outer race or hub 122 with a hub flange 124 having an aperture 126. The wheel bearing 110 further includes rolling elements such as spherical balls 131, an inner ring 140 and a sensor assembly 142.

In the wheel bearing 110, the spindle 112 has a lip 160. The lip 160 is a sleeve-like extension of the spindle 112 in an informed 25JN98 9SK state having a cylindrical support surface 162. In this example, the lip 160 tapers in an axial dimension. If the spindle 112 were solid, the lip 160 could be formed by cutting a central bore into an axial inner end of the spindle 112. The lip 160 includes a stop shoulder 164 machined perpendicular to the support surface 162 and is located inboard of the outboard inner pathway 134 to provide a surface for the inner ring 140 to rest against. The inner ring 140 is secured against the stop shoulder 164 in a manner to be described. The outboard rolling element row 128 and inboard rolling element row 130 are formed similar to the rows 28 and 30 to form pathways 132, 136, 138. Once the spherical balls 131 are installed, the inner ring 140 is pressed onto the outer diameter of the spindle 112 until it rests against the stop shoulder 164.

Figure 4:
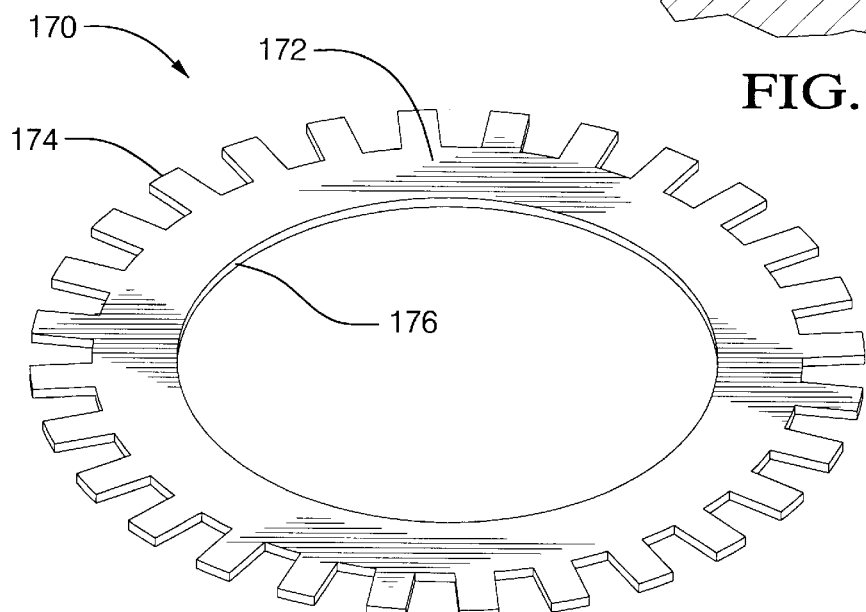
FIG. 4 is a perspective view of a sensor ring, according to the present invention, of the wheel bearing of FIG. 3.

Referring to FIGS. 3 and 4, the sensor assembly 142 includes a sensor 144 and a sensor ring 170, according to the present invention. The sensor ring 170 includes a generally flat ring portion 172 having a plurality of teeth 174 evenly spaced along an outer diameter of the ring portion 172. Advantageously, the sensor ring 170 is stamped from a sheet metal material, such as plain carbon steel. Axially extending teeth 174 may be formed through a folding operation as known in the art.

The sensor ring 170 is placed over the spindle 112. To retain the sensor ring 170 on the spindle 112, the end of the lip 160 is deformed into an annular bead 166 that captures the inner diameter of the sensor ring 170 between the inner ring 140 and the bead 166. For example, an orbital forming tool, as is known in the art, can be used to form the bead 166 by rocking or orbiting the forming tool around the center axis of rotation 114 of the wheel bearing 110, while concurrently applying a force. The lip 160 is forced axially inward and rolled radially outward, gradually deforming it into the bead 166, so that the bead 166 provides axial retention of the sensor ring 170 on the spindle 112.

Figure 5:
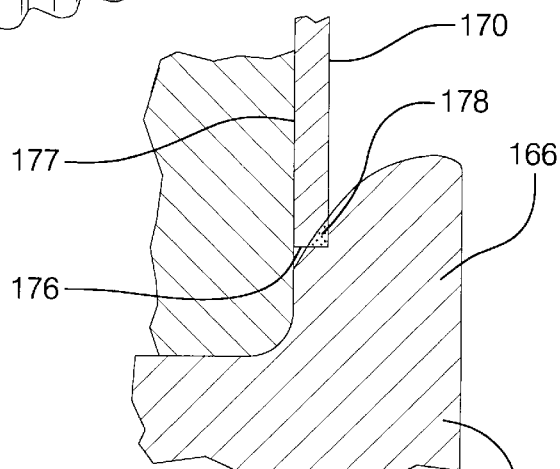
FIG. 5 is an enlarged view of a circled portion of FIG. 3 illustrating the relationship between the sensor ring and a spindle for the wheel bearing of FIG. 3.

Referring to FIG. 5, the sensor ring 170 is illustrated installed onto the wheel bearing 110 according to the present invention. An inner diameter 176 of the sensor ring 170 is captured between the bead 166 and an end 177 of the inner ring 140. Preferably, there is a slight interference, shown at 178, between the inner diameter 176 of the sensor ring 170 and the bead 166 that retains the sensor ring 170 onto the spindle 112, so that the sensor ring 170 and spindle 112 rotate in unison. It should be appreciated that since the sensor ring 170 is made from a relatively soft material, the interference 178 results in a controlled deformation of the sensor ring 170, which preserves the alignment of the sensor ring 170 in relation to the sensor 144. Advantageously, the two-dimensional shape of the sensor ring 170 allows for bilateral installation.

Figure 6:
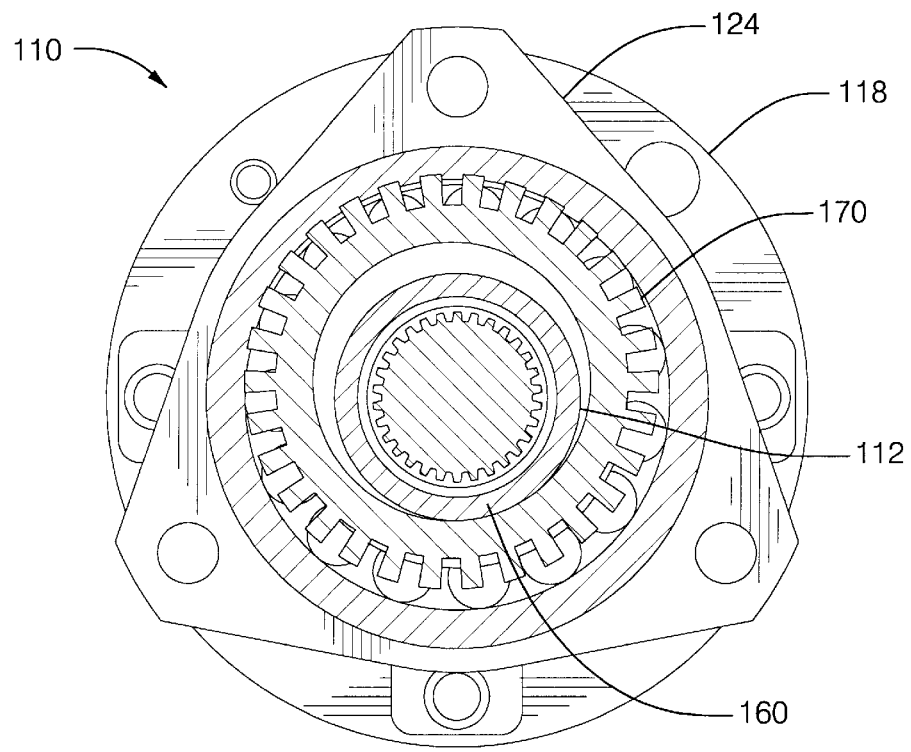
FIG. 6 is a fragmentary end view of the wheel bearing of FIG. 3 illustrating the position of the sensor ring before forming.
Figure 7:
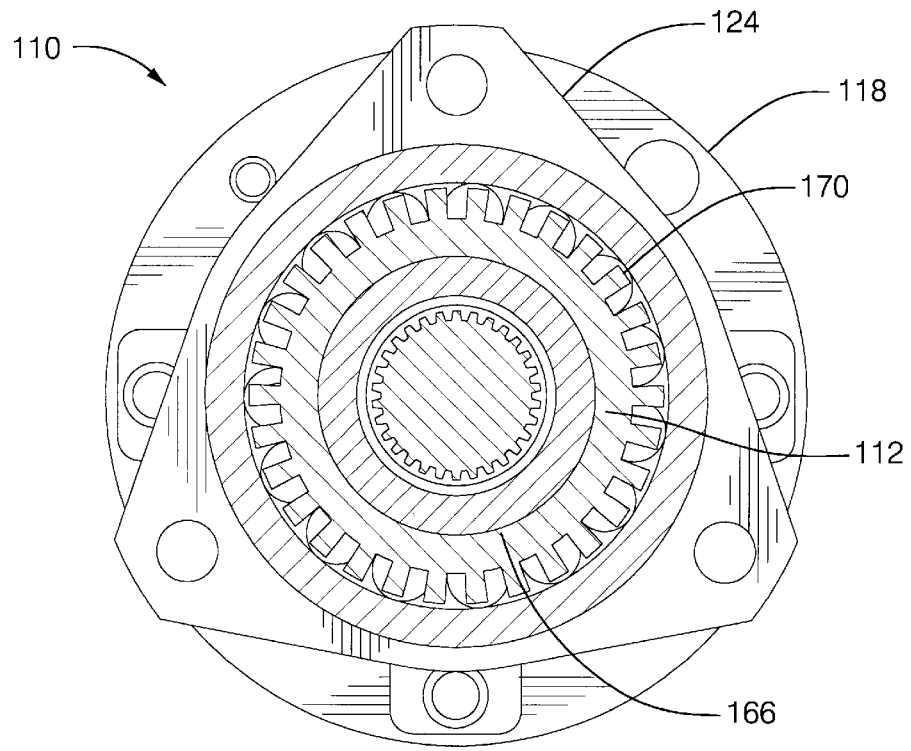
FIG. 7 is a view similar to FIG. 6 illustrating the position of the sensor ring after forming.

Referring to FIGS. 6 and 7, the self-aligning feature of the sensor ring 170 is best illustrated as viewed from an end of the wheel bearing 110. Advantageously, the formation of the bead 166 through the orbital forming process previously described, self-aligns the sensor ring 170 into a concentric position with respect to the center axis of rotation 114. As shown in FIG. 6, the sensor ring 170 is first placed over the spindle 112. At this point, the sensor ring 170 position is not 26JN98 9SK concentric in relation to the center axis of rotation 114. During the orbital forming process, the lip 160 of the spindle 112 moves radially along the face 177 of the inner ring 140. If the sensor ring 170 is not concentric to the inner ring 140, the leading edge of the bead 166 moves the sensor ring 170 into a concentric relationship, as best illustrated in FIG. 7. After the bead 166 is formed, the concentricity of the sensor ring 170 with respect to the center axis of rotation 114 of the wheel bearing 110 is assured.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A wheel bearing comprising:

a spindle having a center axis of rotation and an annular formed bead on an axial end of said spindle; and a self-aligning sensor ring disposed concentric with the center axis of rotation of said spindle and positioned on said spindle and retained adjacent said bead on said spindle.

2. A wheel bearing according to claim 1 wherein said sensor ring has a flat ring portion with an inner diameter mounted about said spindle and forming an interference between said inner diameter and said bead.

3. A wheel bearing according to claim 2 wherein said sensor ring includes a plurality of evenly spaced teeth extending radially from an outer diameter of said flat ring portion.

4. A wheel bearing according to claim 1 wherein said bead is formed by deforming said axial end of said spindle axially inward and radially outward and wherein during formation the sensor ring is allowed to move and the bead has a leading edge that moves the sensor ring into concentricity with the center axis of rotation.

5. A wheel bearing according to claim 1 including an inner ring mounted about said spindle such that said sensor ring is retained between said inner ring and said bead.

6. A wheel bearing according to claim 5 including a stationary hub disposed about and spaced from said inner ring and said spindle.

7. A wheel bearing according to claim 6 including a sensor disposed in operational relationship with said sensor ring for detecting rotation of said sensor ring.

8. A wheel bearing as set forth in claim 6 including a pair of axially spaced rows of rolling elements supporting said spindle and said hub for coaxial rotation relative thereto, with one row of rolling elements running on a pathway of said inner ring and said hub.

9. A wheel bearing comprising:

a rotatable spindle having a center axis of rotation and an annular formed bead on an axial end of said spindle wherein said spindle is operably connected to a wheel of a motor vehicle;

a stationary outer hub surrounding said spindle for connection to vehicle structure of the motor vehicle;

an inner ring interferingly secured about an outer diameter of said spindle;

a pair of axially spaced rows of rolling elements disposed between said hub and said inner ring and said spindle for allowing rotation of said spindle and said inner ring relative to said hub; and a self-aligning sensor ring disposed over said axial end of said spindle concentric with said center axis of rotation and retained on said spindle between said bead and said inner ring.

10. A wheel bearing according to claim 9 wherein said sensor ring includes a flat ring portion and a plurality of evenly spaced teeth extending radially from an outer diameter of said flat ring portion.

11. A wheel bearing according to claim 9 wherein said sensor ring has a flat ring portion with an inner diameter mounted about said spindle and forming an interference between said inner diameter and said bead.

12. A wheel bearing according to claim 9 wherein said bead is formed by deforming said axial end of said spindle axially inward and to radially outward and wherein during formation the sensor ring is allowed to move and the bead has a leading edge that moves the sensor ring into concentricity with the center axis of rotation.

13. A wheel bearing according to claim 9 including a sensor disposed in operational relationship with said sensor ring for detecting rotation of said sensor ring.

14. A wheel bearing comprising:
- a rotatable spindle having a center axis of rotation and an annular formed bead on an axial end of said spindle, wherein said spindle is operably connected to a wheel of a motor vehicle;
- a stationary outer hub surrounding said spindle wherein said spindle is operably connected to vehicle structure of the motor vehicle;
- an inner ring interferingly secured about an outer diameter of said spindle;
- a pair of axially spaced rows of rolling elements disposed between said hub and said inner ring and said spindle for allowing rotation of said spindle and said inner ring relative to said hub;
- a self-aligning sensor ring disposed over the axial end of said spindle concentric with the center axis of rotation between said bead and said inner ring;
- said sensor ring including a flat ring portion and a plurality of evenly spaced teeth extending radially from an outer diameter of said flat ring portion;
- said sensor ring having an inner diameter mounted about said spindle and forming an interference between said inner diameter and said bead; and
- a sensor disposed in operational relationship with said sensor ring for detecting rotation of said sensor ring.

\* \* \* \* \*